Patented Nov. 7, 1939

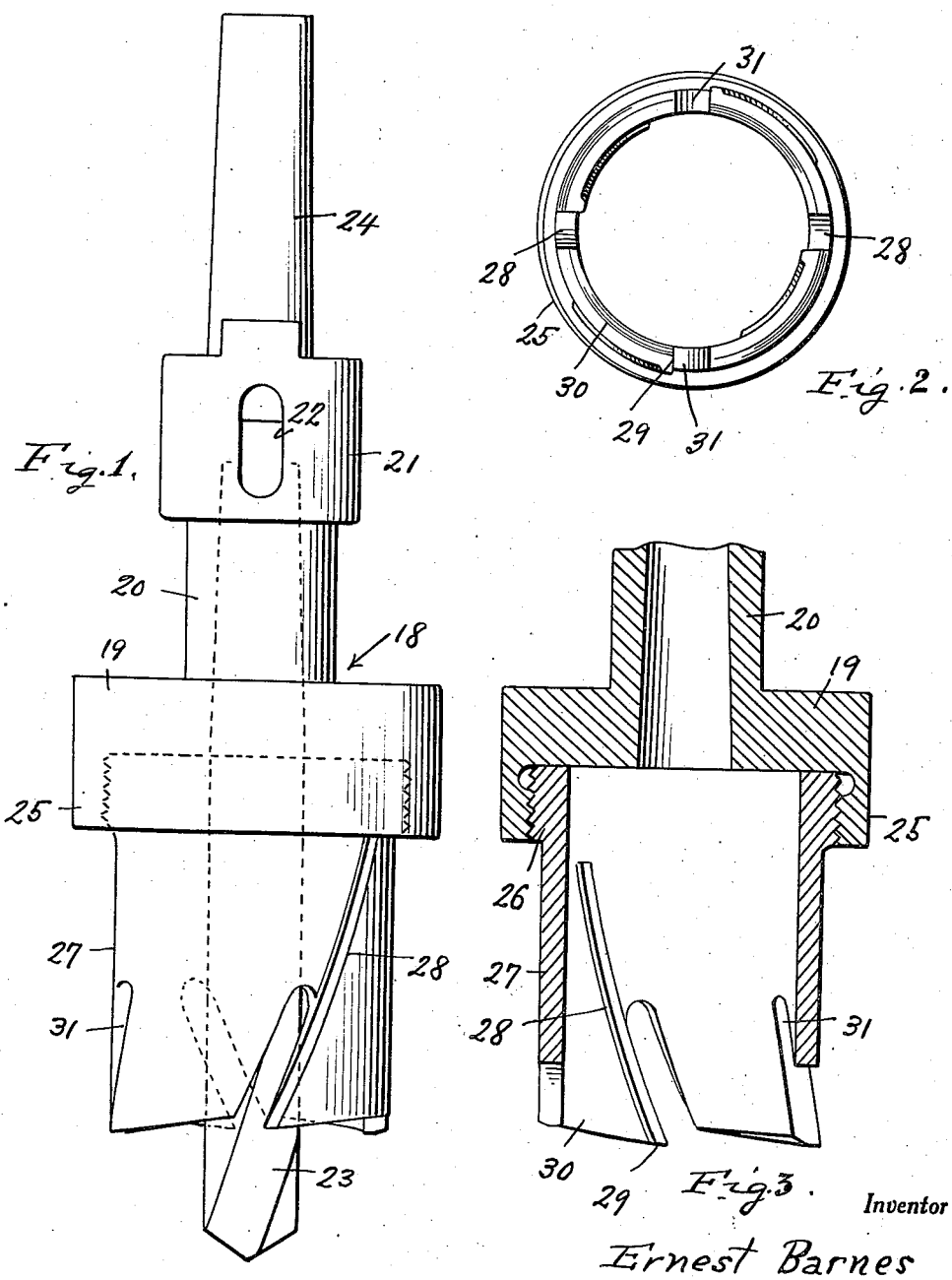

2,179,029

UNITED STATES PATENT OFFICE 2,179,029

BORING TOOL

Ernest Barnes, Gilroy, Calif.

Application November 2, 1938, Serial No. 238,484

2 Claims. (Cl. 77—69)

This invention relates to new and useful improvements in tools and more particularly to a boring tool adapted to bore openings in metal work in a quick and accurate manner.

Another important object of the invention is to provide a boring implement which includes a bit and cutting element, the bit being employed for first forming a centering opening for the final opening to be cut.

These and other objects and advantages of the invention will become apparent to the reader of the following specification.

In the drawing:

Figure 1 is a side elevational view of a modified form, such as will be especially adapted for use on drill presses.

Figure 2 is an end elevational view showing the cutting skirt of the form of the invention shown in Figure 1.

Figure 3 is a fragmentary detailed sectional view taken substantially on a line 3—3 of Figure 2.

Referring to the drawing wherein like numerals designate like parts, it can be seen that the tool is generally referred to by numeral 18 and consists of the head 19 from which extends the shank 20 having the enlarged portion 21 provided with the keyway 22 therein. The shank 20 and enlargement 21 are hollow to receive the shank portion of the centering bit 23. The upper portion of the shank 20 is tapered as at 24 for insertion into the chuck of the drilling machine.

The head portion 19 is provided with a depending internally threaded skirt 25 for receiving the upper enlarged and externally threaded portion 26 of the drilling cylinder 27. This cylinder is provided with spirally directed upwardly extending slots 28, extending upwardly from the lower edge thereof as from the cutting tip 29 of the depending cutting formation 30 which are further defined by short inwardly extending and spirally directed slots 31.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. A boring tool comprising a body, said body being internally threaded, a cutting cylinder extending therefrom, one end of the cylinder being externally threaded for disposition in the internally threaded head and having its opposite end formed to provide cutting teeth, said teeth having cutting edges, said cylinder being formed with inwardly and spirally directed slots extending from the cutting points of the teeth.

2. A boring tool comprising a body, said body being internally threaded, a cutting cylinder extending therefrom, one end of the cylinder being externally threaded for disposition in the internally threaded head and having its opposite end formed to provide cutting teeth, said teeth having cutting edges, said cylinder being formed with inwardly and spirally directed slots extending from the cutting points of the teeth, said body having an opening therein, and a bit extending from the body and being held in the opening, said bit extending centrally through the said cutting cylinder.

ERNEST BARNES.